(12) United States Patent
Weh et al.

(10) Patent No.: US 11,136,016 B2
(45) Date of Patent: Oct. 5, 2021

(54) PISTON PUMP ASSEMBLY

(71) Applicant: Robert Bosch GmbH, Stuttgart (DE)

(72) Inventors: Andreas Weh, Sulzberg (DE); Matthias Mayr, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 15/778,571

(22) PCT Filed: Sep. 28, 2016

(86) PCT No.: PCT/EP2016/073073
§ 371 (c)(1),
(2) Date: May 23, 2018

(87) PCT Pub. No.: WO2017/089007
PCT Pub. Date: Jun. 1, 2017

(65) Prior Publication Data
US 2018/0345934 A1    Dec. 6, 2018

(30) Foreign Application Priority Data
Nov. 27, 2015   (DE) ...................... 10 2015 223 507.6

(51) Int. Cl.
*B60T 13/16*        (2006.01)
*B60T 8/40*         (2006.01)
(Continued)

(52) U.S. Cl.
CPC ............ *B60T 13/16* (2013.01); *B60T 8/4018* (2013.01); *B60T 17/02* (2013.01); *F04B 9/02* (2013.01);
(Continued)

(58) Field of Classification Search
CPC .. F04B 9/02; F04B 17/03; F04B 35/04; F04B 39/005; F04B 53/114;
(Continued)

(56) References Cited

U.S. PATENT DOCUMENTS 6,230,492 B1 * 5/2001 Kingston .............. B60T 13/745
                                                        60/545
6,767,305 B2 * 7/2004 Backes ................... F16D 65/18
                                                        188/161
(Continued)

FOREIGN PATENT DOCUMENTS

DE         3717236      12/1988
DE    102012217272 A1    4/2013
(Continued)

OTHER PUBLICATIONS

International Search Report for PCT/EP2016/073073, dated Dec. 8, 2016.

*Primary Examiner* — Bryan M Lettman
(74) *Attorney, Agent, or Firm* — Norton Rose Fulbright US LLP; Gerard Messina

(57) ABSTRACT

A piston pump assembly for a hydraulic vehicle brake system having an electric motor and, coaxially to that, a planetary gear, a ball-screw drive and a piston-cylinder unit, in which a piston is connected in a rotatably and axially fixed manner to a spindle of the ball-screw drive and guiding the piston in a rotatably fixed manner in the cylinder, so that the spindle (20) is retained in a rotatably fixed manner. Also, the planetary gear is mounted in a pot-shaped planetary-gear housing that is disposed on a ball bearing which is used for a rotational mounting of a spindle nut on a cylinder of the piston-cylinder unit.

22 Claims, 3 Drawing Sheets

(51) Int. Cl.
*B60T 17/02* (2006.01)
*F04B 9/02* (2006.01)
*F04B 17/03* (2006.01)
*F16H 25/20* (2006.01)
*F16H 25/22* (2006.01)

(52) U.S. Cl.
CPC ............. *F04B 17/03* (2013.01); *F16H 25/20* (2013.01); *F16H 25/2204* (2013.01); *F16H 2025/2087* (2013.01)

(58) Field of Classification Search
CPC ........ B60T 13/16–13/20; B60T 8/4018; B60T 8/4022; B60T 17/02; F16H 25/20; F16H 2025/2087; F16H 25/2204
See application file for complete search history.

(56) References Cited

U.S. PATENT DOCUMENTS

| | | | |
|---|---|---|---|
| 7,871,084 B2 * | 1/2011 | Hakui | F16D 3/06 |
| | | | 280/5.521 |
| 2005/0077782 A1 | 4/2005 | Horiuchi et al. | |
| 2015/0322931 A1 * | 11/2015 | Weh | B60T 8/4018 |
| | | | 417/415 |

FOREIGN PATENT DOCUMENTS

| | | | | |
|---|---|---|---|---|
| EP | 0292648 | | 11/1988 | |
| WO | 03020563 | | 3/2003 | |
| WO | 2014086517 | | 6/2014 | |
| WO | WO2014086517 | * | 6/2014 | ............. F04B 17/03 |

* cited by examiner

PISTON PUMP ASSEMBLY

FIELD OF THE INVENTION

The present invention relates to a piston pump assembly for a hydraulic vehicle brake system.

BACKGROUND INFORMATION

Piston pumps are used in hydraulic vehicle non-muscular-energy brake systems to generate a hydraulic brake pressure for a service brake application and/or in slip-controlled vehicle brake systems, likewise to generate a brake pressure and, after a pressure reduction, to deliver brake fluid from wheel brakes back to the wheel brakes in order to increase the wheel brake pressures again or back in the direction of a master brake cylinder during a slip control.

SUMMARY OF THE INVENTION

The piston pump assembly according to the present invention having the features described herein is provided to generate a brake pressure and/or to deliver brake fluid in a hydraulic non-muscular-energy and/or slip-controlled vehicle brake system. It has an electric motor as drive and a planetary gear that is able to be driven by the electric motor. The piston pump assembly according to the present invention also has a helical gear, e.g., a spindle drive, that is able to be driven rotatively by the electric motor via the planetary gear and that converts a rotational motion into a displacement. In addition, the piston pump assembly of the present invention has a piston-cylinder unit, having a cylinder and a piston that is displaceable in the cylinder by the helical gear. The helical gear has a drive element able to be driven rotatively, e.g., a spindle nut or a spindle, and a displaceable output element that is shifted in response to rotational driving of the drive element, e.g., a spindle or spindle nut.

According to the present invention, the displaceable output element of the helical gear is connected in rotatably and axially fixed manner to the piston of the piston-cylinder unit. The piston may thereby be shifted not only in one direction, denoted here as working stroke and by which the piston displaces brake fluid from the cylinder, but also in an opposite direction, which is denoted here as return stroke, in which the piston draws brake fluid into the cylinder. In this context, a vacuum forms in the cylinder of the piston-cylinder unit, against which the piston must be moved during the return stroke. In addition, friction must be overcome. The piston may be joined to the output element of the helical gear with force locking, e.g., by pressing in or pressing on or by shrink fitting. A material-locking connection, e.g., by adhesive bonding, soldering or welding, or a form-locking connection, e.g., by a screw connection, are likewise possible. Combinations of the types of connection are possible, as well.

In addition, the piston is retained in rotatably fixed manner in the cylinder, and via the rotatably fixed connection with the displaceable output element of the helical gear, retains the output element in rotatably fixed fashion, so that upon rotational driving of the drive element of the helical gear, it does not co-rotate, but rather is shifted.

The further descriptions herein have as their subject matter advantageous refinements and further developments of the main descriptions herein.

Further features of the invention are derived from the following description of a specific embodiment of the invention in conjunction with the claims and the drawing. The individual features may each be realized separately or severally in any combination in specific embodiments of the invention, specific embodiments which do not include all features of the main descriptions herein not being excluded.

The invention is explained in greater detail below on the basis of a specific embodiment shown in the drawings.

DETAILED DESCRIPTION

Figure 1:
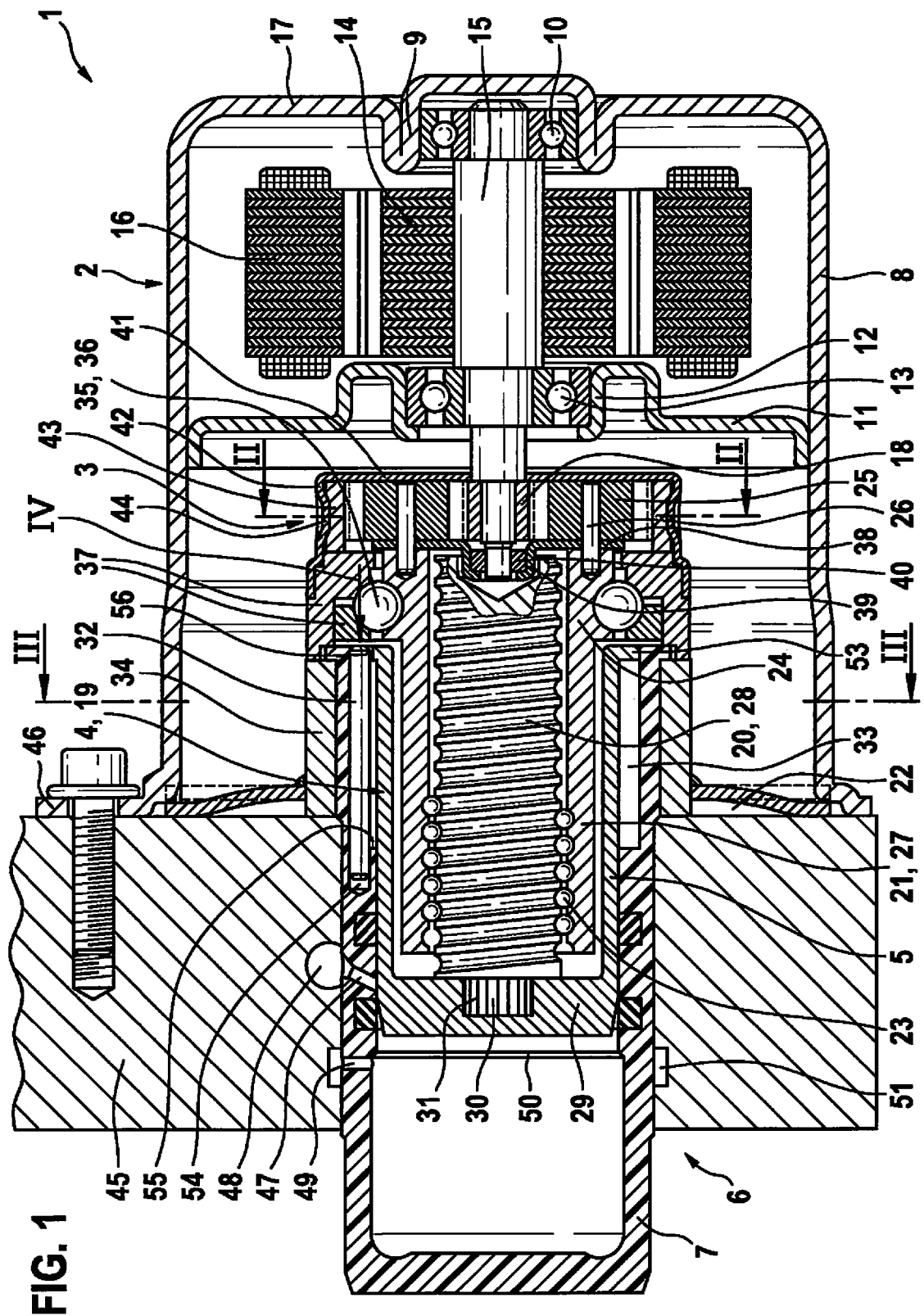
FIG. 1 shows a schematized and simplified axial sectional view of a piston pump assembly according to the present invention.

Piston pump assembly 1 shown in the drawing is provided to generate pressure in a hydraulic non-muscular-energy vehicle brake system and/or to generate pressure and to deliver brake fluid in a slip-controlled hydraulic vehicle brake system during a slip control. For example, such slip controls are antilock braking systems, traction control systems, vehicle dynamics controls and electronic stability programs, for which the abbreviations ABS, TCS, VDC and ESP are customary.

For the drive, piston pump assembly 1 according to the present invention has an electric motor 2, by which a planetary gear 3 is able to be driven. Planetary gear 3 drives a helical gear 4 rotatively, which converts the rotational motion into a displacement in order to shift a piston 5 of a piston-cylinder unit 6 in a cylinder 7.

Electric motor 2 has a hollow cylindrical, pot-shaped motor housing 8 having a bearing seat 9 in which a motor-shaft bearing 10 is disposed. In approximately a longitudinal center of motor housing 8, an end shield 11 is disposed, which has a bearing seat 12 in which a further motor-shaft bearing 13 is located. Between the two motor-shaft bearings 10, 13, a rotor 14 is disposed in rotationally fixed manner on a motor shaft 15 of electric motor 2, which is rotationally mounted with motor-shaft bearings 10, 13. Rotor 14 is encompassed by a stator 16 that is disposed immovably between a motor-housing bottom 17 and end shield 11 in motor housing 8.

On a side facing away from rotor 14, motor shaft 15 protrudes from end shield 11, and has a sun wheel 18 of planetary gear 3 mounted on it there in rotatably fixed manner.

In the specific embodiment of the invention described and illustrated, helical gear 4 is a spindle drive, namely, a ball-screw drive 19 having a spindle 20 which is enclosed coaxially by a tubular spindle nut 21. Spindle 20 and spindle nut 21, and consequently ball-screw drive 19 are disposed coaxially with respect to planetary gear 3 and electric motor 2. Ball-screw drive 19 is located with a portion of its length on a side of end shield 11 facing away from rotor 14 and stator 16, within motor housing 8. In response to rotational driving of spindle nut 21, balls as rolling bodies 23 of ball-screw drive 19 circulate in helical grooves on spindle 20 and in spindle nut 21, whereby a rotary motion of spindle nut 21 is converted into an axial displacement of rotatably fixed spindle 20. Planetary gear 3 is disposed between ball-screw drive 19 and end shield 11 of electric motor 2.

At the same time, spindle nut 21 forms a planet carrier 24 for planet wheels 25 of planetary gear 3, that are rotatably mounted on cylindrical pins 26 which are pressed parallel to the axis into blind holes in an end face of spindle nut 21 facing planetary gear 3, spindle nut 21 thereby, as said, forming planet carrier 24 for planet wheels 25 of planetary gear 3. Rotational driving of sun wheel 18 of planetary gear 3 by electric motor 2 sets planet wheels 25 of planetary gear 3 into a rotational movement about cylindrical pins 26 on which they are rotatably mounted, and at the same time drives planet wheels 25 to an orbital motion on a concentric circular path around sun wheel 18, whereby spindle nut 21 is driven rotatively, which displaces spindle 20 axially. Therefore, spindle nut 21 may also be regarded in general as rotatable driving element 27 and spindle 20 as displaceable output element 28 of ball-screw drive 19 or rather of helical gear 4. A reversal, that is, rotational driving of spindle 20, which in this case would form a rotatable driving element of ball-screw drive 19 or of helical gear 4, and a displacement of spindle nut 21, which in this case would form a displaceable output element of ball-screw drive 19 or rather of helical gear 4 (not shown), is also conceivable.

Piston 5 of piston-cylinder unit 6 of piston pump assembly 1 according to the present invention is a hollow piston which encircles spindle nut 21 concentrically. A piston head 29 abuts an end face of spindle 20 facing away from electric motor 2 and planetary gear 3. To join piston 5 to spindle 20, spindle 20 has a coaxial pin 30, which is pressed into a precisely fitting countersink in piston head 29. To increase the strength of the connection, pin 30 has a knurl 31. Piston 5 and spindle 20 are joined to each other in rigid, thus, in rotatably-fixed and axially-fixed manner.

Figure 3:
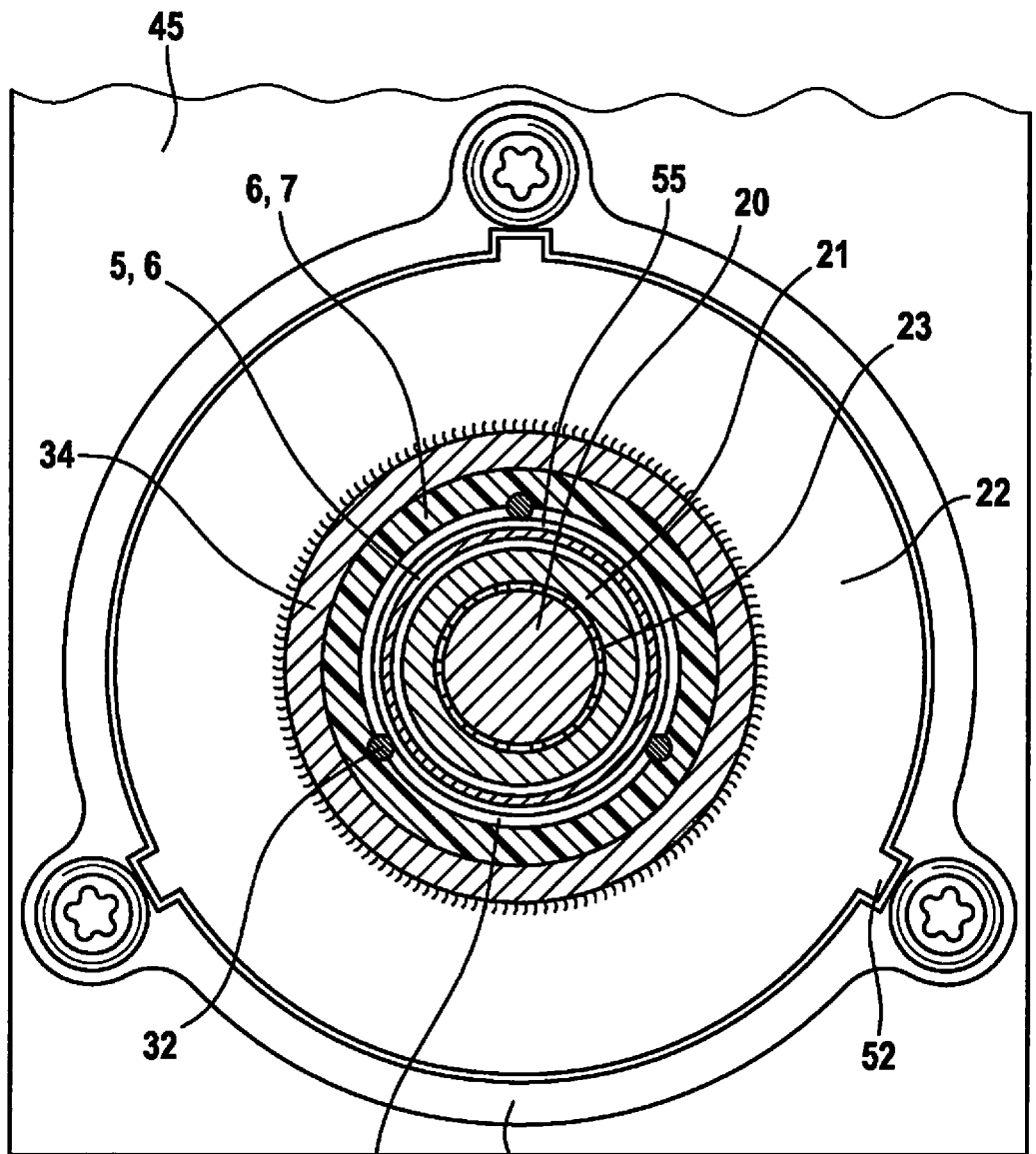
FIG. 3 shows a cross-section along line III-III in FIG. 1. d
Figure 4:
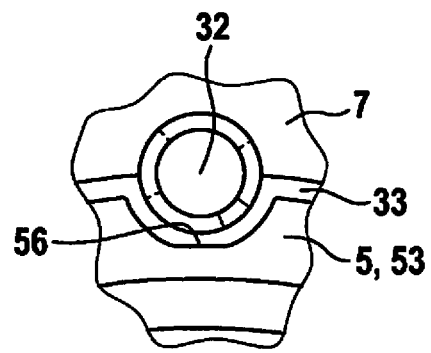
FIG. 4 shows a front view of a position of a piston of the piston pump assembly according to arrow IV in FIG. 1.

Piston 5 is retained in rotatably fixed fashion in cylinder 7 of piston-cylinder unit 6 by one or more cylindrical pins 32 distributed uniformly or non-uniformly over the circumference, which besides being seen in the axial section of FIG. 1, may be seen well in the cross-section of FIG. 3 and in the front view of flange 53 of piston 5 in the area of a cylindrical pin 32 in FIG. 4. Cylindrical pins 32 are pressed into axially parallel blind holes 54 in an annular step 55 of cylinder 7 and pass through recesses 56 in a flange 53 at an open end of cylinder 7. In response to a stroke of piston 5, flange 53 of piston 5 shifts in an annular space 33 between piston 5 and cylinder 7, and is retained by recesses 56 in its flange 53 in rotatably fixed manner on cylindrical pins 32. Spindle 20 of ball-screw drive 19, which is connected in rotatably fixed and axially fixed manner to piston 5, is retained in rotatably fixed manner in cylinder 7 via piston 5. In principle, it is also possible to retain piston 5 in rotatably fixed and axially displaceable manner in cylinder 7 in a manner other than with cylindrical pins 32 (not shown). Other possibilities also exist for retaining piston 5 in displaceable and rotatably-fixed fashion in cylinder 7, for example, one or more pins that are disposed radially in piston 5 or in cylinder 7 and that grab into an axially parallel slot in cylinder 7 or in piston 5, a key-slot connection, a multi-slot or multi-tooth profile or a polygonal or, at any rate, non-circular (e.g., also oval or elliptical) piston 5 and cylinder 7 (not shown). The present invention is not limited to the exemplary embodiment.

Cylinder 7 of piston-cylinder unit 6 is encircled by a sleeve 34, which connects cylinder 7 with a fastener 22. In the exemplary embodiment, fastener 22 is a perforated disk which projects as a flange from sleeve 34 and is welded or joined to it in some other way. Cylinder 7 extends somewhat through the perforated disk forming fastener 22 into motor housing 8, and otherwise projects from motor housing 8, in the specific embodiment of the invention described and illustrated, the part of cylinder 7 projecting out of motor housing 8 being approximately twice as long as the part extending into motor housing 8. A front edge of motor housing 8 overlaps fastener 22, whereby motor housing 8, screwed to hydraulic block 45, retains cylinder 7 on hydraulic block 45. Fastener 22 formed as perforated disk is attached to sleeve 34 with some distance from an end face of sleeve 34 on the hydraulic-block side, so that at an inner edge, fastener 22 has distance from hydraulic block 45 when sleeve 34 abuts on hydraulic block 45. At an outer edge, a flange 46 of motor housing 8 presses fastener 22 against the hydraulic block, so that fastener 22 presses sleeve 34 with preloading against hydraulic block 45. Unloaded, fastener 22 is a flat perforated disk, as drawn with dashed lines in FIG. 1. Owing to the preloading, fastener 22 retains cylinder 7 on hydraulic block 45 and prevents an axial movement of cylinder 7, e.g., due to accelerations during operation. In addition, relative movements between cylinder 7, spindle nut 21, planetary gear 3, hydraulic block 45 and electric motor 2 are prevented by the preloading of fastener 22. Moreover, the preloading of fastener 22 prevents rotation of cylinder 7 due to driving torques.

As can be seen in FIG. 3, clearance exists in the radial direction between the front edge of motor housing 8 and fastener 22, so that before it is bolted to hydraulic block 45, electric motor 2 may be aligned coaxially with respect to piston-cylinder unit 6, ball-screw drive 19 and planetary gear 3. To transmit torque, fastener 22 has outwardly projecting noses 52 that engage in cutouts in flange 46 of motor housing 8 of electric motor 2 (FIG. 3). Axial forces produced by planetary gear 3 and ball-screw drive 19 are transmitted via planetary-gear housing 42, a bearing ring 37 of a ball bearing 35 and sleeve 34 to cylinder 7 of piston-cylinder unit 6, and are thus supported.

Piston-cylinder unit 6 is coaxial with ball-screw drive 19, planetary gear 3 and electric motor 2. Pin 30 of spindle 20 pressed into the countersink in piston head 29 forms a force-locking connection of spindle 20 as displaceable output element 28 of ball-screw drive 19 or of helical gear 4 and of piston 5 of piston-cylinder unit 6. Other force-locking, form-locking and/or material-locking rotatably-fixed and axially-fixed connections of piston 5 with spindle 20 are possible (not shown).

Spindle nut 21, which also forms planet carrier 24 for planet wheels 25 of planetary gear 3, is rotatably mounted with ball bearing 35 on cylinder 7 of piston-cylinder unit 6. In the specific embodiment of the invention shown and described, ball bearing 35 is disposed at an open end face of cylinder 7 facing planetary gear 3 and electric motor 2. It has balls 36 as rolling bodies which roll or circulate in a circumferential groove as ball race at the periphery of spindle nut 21 on one hand, and in two-piece bearing ring 37. Bearing ring 37 is secured to sleeve 34 and therefore to cylinder 7. Ball bearing 35 supports spindle nut 21 axially on cylinder 7. An axial force, which piston 5 causes when it is pushed into cylinder 7 to generate pressure, and in so doing, displaces brake fluid from cylinder 7, is transmitted via spindle 20 and balls 23 to spindle nut 21 which, as described, is supported by ball bearing 35 on cylinder 7. Upon the shift of piston 5 into cylinder 7, which may also be referred to as forward stroke, working stroke or displacement stroke, piston 5 supports itself axially on spindle 20, with its piston head 29 abutting the end face of spindle 20. In the case of an opposite return stroke, in which piston 5 draws brake fluid into cylinder 7 and must overcome friction, the axial force on piston 5 is considerably less, for which the force-locking connection of pin 30 of spindle 20 pressed into the countersink in piston head 29 is sufficient.

Between the end face of spindle nut 21 facing planetary gear 3, and planet wheels 25, a sliding disk 38 is disposed, through which cylindrical pins 26 pass, that are pressed into the end face of spindle nut 21 and on which planet wheels 25 are rotatably mounted. Cylindrical pins 26 center sliding disk 38 on spindle nut 21 and retain sliding disk 38 in rotatably fixed manner on spindle nut 21. Sliding disk 38 has a bearing seat 39 in which a friction bearing 40 is disposed that rotatably supports one end of motor shaft 15 on a side of sun wheel 18 facing away from rotor 14 and stator 16. Via friction bearing 40, sliding disk 38 aligns motor shaft 15 with sun wheel 18 coaxially with respect to planet wheels 25.

Planet wheels 25 are supported in an axial direction against sliding disk 38. In the opposite direction, planet wheels 25 are supported on a bottom 41 of a planetary-gear housing 42 that is formed in flat cup-shaped fashion with a hollow-cylindrical peripheral wall that is affixed to bearing ring 37 of ball bearing 35, which on its part, is disposed at the open end face of cylinder 7 of piston-cylinder unit 6. Planetary gear 3 has helical teeth, planet wheels 25 being braced—against axial forces caused by the helical teeth—in one direction on sliding disk 38 and in the opposite direction on bottom 41 of planetary-gear housing 42, so that no axial securing of planet wheels 25 on cylindrical pins 26 is necessary. A slant of the helical teeth of planetary gear 3 may be selected so that axial forces during a foreword and displacement stroke of piston 5 act upon planet wheels 25 against sliding disk 38, so that planet wheels 25 are supported via sliding disk 38 on spindle nut 21, because the axial forces during a displacement stroke of piston 5 are greater than in the case of the return stroke. As described, during the return stroke, planet wheels 25 are supported on bottom 41 of planetary-gear housing 42, which is disposed on bearing ring 37 of ball bearing 35. Planetary-gear housing 42 forms a lubricant chamber that keeps lubricant of planetary gear 3 and of ball-screw drive 19 in the gears and away from electric motor 2.

Figure 2:
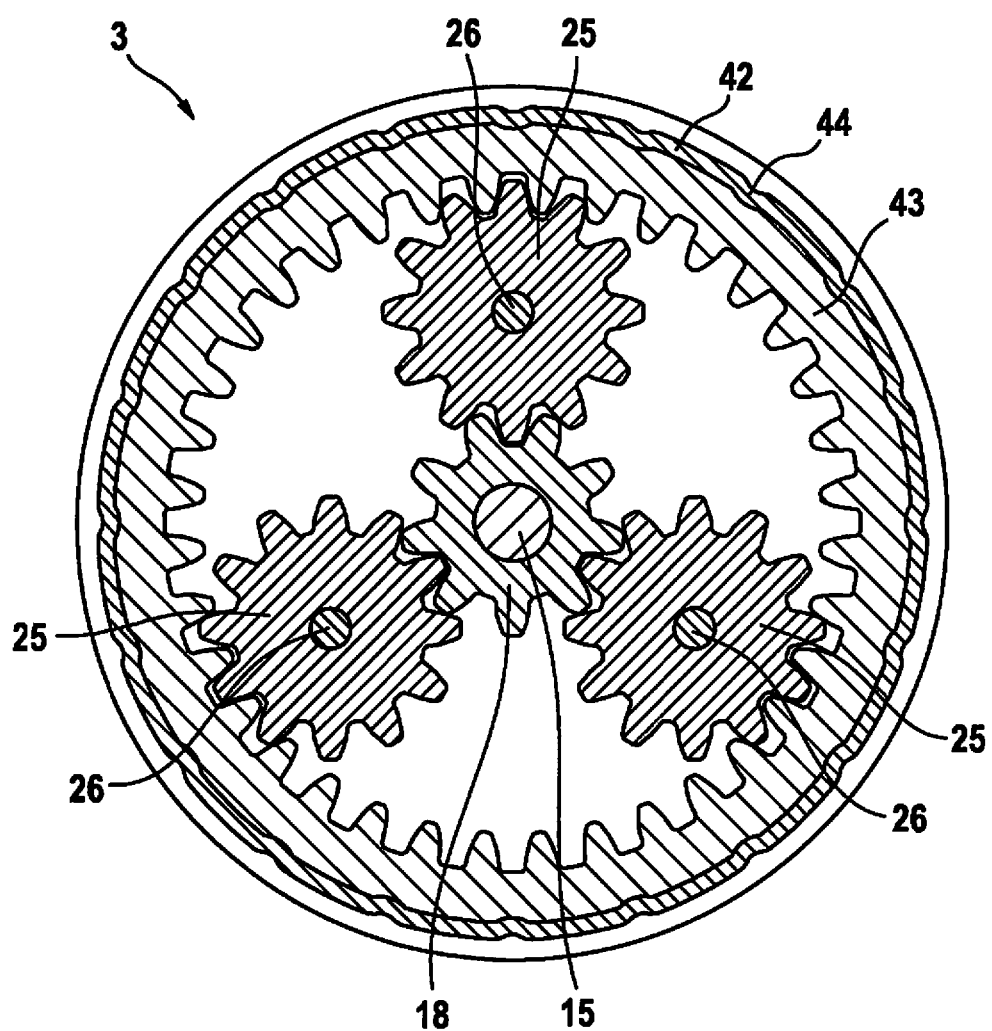
FIG. 2 shows a cross-section along line II-II in FIG. 1.

Disposed in planetary-gear housing 42 is an internal gear wheel 43 of planetary gear 3, which at its periphery, has axially parallel grooves in which inwardly formed, axially parallel beads 44 of the peripheral wall of planetary-gear housing 42 engage, and in this way, retain internal gear wheel 43 in rotatably fixed fashion (see FIG. 2). Axially, internal gear wheel 43 is supported on bearing ring 37 of ball bearing 35 on one side, and on bottom 41 of planetary-gear housing 42.

Piston pump assembly 1 of the present invention is disposed on a hydraulic block 45 of a slip control of an otherwise not shown hydraulic non-muscular-energy vehicle brake system, piston pump assembly 1 being part of the slip control. Such slip controls and hydraulic blocks 45 are known per se to one skilled in the art and are not explained in greater detail here. Hydraulic block 45 is used for mechanical fixation and hydraulic interconnection of hydraulic, electrohydraulic and electronic components of the slip control, which besides piston pump assembly 1, include solenoid valves, non-return valves, hydraulic accumulators and damping chambers which are disposed in and on hydraulic block 45 and are interconnected hydraulically through a (not shown) drilling of hydraulic block 45. Cylinder 7 of piston-cylinder unit 6 of piston pump assembly 1 projecting from motor housing 8 passes in sealed fashion through hydraulic block 45, motor housing 8 abuts with its front edge and fastener 22 against hydraulic block 45, and is screw-connected at flange 46 of motor housing 8 to hydraulic block 45. Fitted with piston pump assembly 1 and the further components of the slip control, hydraulic block 45 forms a hydraulic unit that is part, that is, a key part of the slip control.

In its peripheral wall, cylinder 7 has a bore as inlet 47, which is overtraveled by piston 5 at the beginning of a working stroke and is thereby closed. Inlet 47 communicates with a brake-fluid-conducting bore 48 in hydraulic block 45. In addition, cylinder 7 has a further bore as inlet and outlet 49 in its peripheral wall, through which piston 5 is able to displace brake fluid from cylinder 7 and draw brake fluid into cylinder 7. Inlet and outlet 49 is overtraveled by piston 5 later than inlet 47. However, cylinder 7 has a diameter expansion 50, by which an annular gap is formed between piston 5 and cylinder 7, so that unlike inlet 47, inlet and outlet 49 is not closed by piston 5, but rather is always in communication with an inner space of cylinder 7. At the level of inlet and outlet 49, hydraulic block 45 has an annular channel 51, encircling cylinder 7, with which inlet and outlet 49 communicates, and which is interconnected hydraulically with further components of the slip control by the drilling (not shown) of hydraulic block 45.

What is claimed is:

1. A piston pump assembly for a hydraulic vehicle brake system, comprising:
  an electric motor;
  a planetary gear that is drivable by the electric motor;
  a helical gear that is drivable into rotative motion by the planetary gear and converts a rotational motion into a displacement; and
  a piston-cylinder unit including a piston that is displaceable in a cylinder by the helical gear;
  wherein:
    a displaceable output element of the helical gear is connected in a rotatably and an axially fixed manner to the piston of the piston-cylinder unit, and the piston is retained in a rotatably fixed manner in the cylinder; and
    at least one of the following two features (1)-(2):
      (1) the helical gear includes a hollow tube with the displaceable output element of the helical gear being at least partly arranged in the hollow tube, the electric motor includes a rotor, and the piston pump assembly further includes a shaft on a back region of which the rotor is radially and fixedly arranged so that rotation of the rotor rotates the shaft, the shaft extending forward from the back region of the shaft to connect to a forward end of the shaft on which a sun wheel of the planetary gear is fixed beyond a front end of the rotor, with (a) the helical gear being arranged forward of the planetary gear, and (b) the sun wheel directly rotating at least one planet wheel whose axial position is at least partially shared with the sun wheel, thereby causing the at least one planet wheel to directly rotate the hollow tube; and
      (2) the planetary gear includes an exterior wheel, the sun wheel, and the at least one planet wheel, the sun wheel and the at least one planet wheel are, with respect to a radial direction, interior to a radial region occupied by the exterior wheel, the at least one planet wheel is in toothed connection with exterior teeth of the sun wheel and in toothed connection with interior teeth of the exterior wheel, and at least one of the following two features (a)-(b):

(a) a rotatable portion of the helical gear forms a planet carrier that carries the at least one planet wheel and on which the at least one planet wheel is rotatably mounted; and
(b) the electric motor is arranged to directly drive the sun wheel to rotate, the sun wheel is arranged to directly drive each of the at least one planet wheel to rotate when the sun wheel is driven to rotate by the electric motor, each of the at least one planet wheel is arranged to orbit a center axis of the exterior wheel when driven to rotate by the sun wheel, and the orbit is the rotative motion of the helical gear.

2. The piston pump assembly of claim 1, wherein the piston and/or the cylinder has mutually opposite, axially parallel grooves and/or recesses, in which a pin engages that retains the piston in a rotatably fixed manner in the cylinder.

3. The piston pump assembly of claim 1, wherein the displaceable output element of the helical gear is connected with force locking to the piston of the piston-cylinder unit.

4. The piston pump assembly of claim 1, wherein a planetary-gear housing in which the planetary gear is accommodated is disposed on the helical gear.

5. The piston pump assembly of claim 4, wherein the planetary gear includes the exterior wheel and the planetary-gear housing retains the exterior wheel of the planetary gear in a rotatably fixed manner and axially at least in one direction.

6. The piston pump assembly of claim 1, wherein the displaceable output element of the helical gear is a spindle, and the helical gear includes the hollow tube within which at least the part of the spindle is arranged and that is drivable rotatably by the planetary gear to thereby axially displace the spindle.

7. The piston pump assembly of claim 1, wherein the helical gear includes the hollow tube with the displaceable output element of the helical gear being at least partly arranged in the hollow tube, the electric motor includes the rotor, and the piston pump assembly further includes the shaft on the back region of which the rotor is radially and fixedly arranged so that rotation of the rotor rotates the shaft, the shaft extending forward from the back region of the shaft to connect to the forward end of the shaft on which the sun wheel of the planetary gear is fixed beyond the front end of the rotor, with (a) the helical gear being arranged forward of the planetary gear, and (b) the sun wheel directly rotating the at least one planet wheel whose axial position is at least partially shared with the sun wheel, thereby causing the at least one planet wheel to directly rotate the hollow tube.

8. The piston pump assembly of claim 7, wherein the shaft is rotatably mounted on the helical gear.

9. The piston pump assembly of claim 1, wherein the planetary gear includes the exterior wheel, the sun wheel, and the at least one planet wheel, the sun wheel and the at least one planet wheel are, with respect to the radial direction, interior to the radial region occupied by the exterior wheel, and the at least one planet wheel is in toothed connection with the exterior teeth of the sun wheel and in toothed connection with the interior teeth of the exterior wheel.

10. The piston pump assembly of claim 9, wherein the rotatable portion of the helical gear forms the planet carrier that carries the at least one planet wheel and on which the at least one planet wheel is rotatably mounted.

11. The piston assembly of claim 9, wherein the electric motor is arranged to directly drive the sun wheel to rotate, the sun wheel is arranged to directly drive each of the at least one planet wheel to rotate when the sun wheel is driven to rotate by the electric motor, each of the at least one planet wheel is arranged to orbit the center axis of the exterior wheel when driven to rotate by the sun wheel, and the orbit is the rotative motion of the helical gear.

12. The piston assembly of claim 11, wherein the at least one planet wheel includes at least three planet wheels that each is arranged to rotate about a respective center axis of the respective planet wheel and orbit the center axis of the exterior wheel.

13. The piston assembly of claim 11, wherein the interior teeth of the exterior wheel cause each of the at least one planet wheel to orbit the center axis of the exterior wheel when the at least one planet wheel is driven to rotate by the sun wheel, the exterior wheel is rotatably fixed relative to the displaceable output element of the helical gear, the orbit of the at least one planet wheel causes a rotation of the rotatable portion of the helical gear, and the rotation of the rotatable portion of the helical gear causes axial displacement of the displaceable output element of the helical gear.

14. The piston assembly of claim 13, wherein the displaceable output element of the helical gear is a spindle, and the helical gear includes the hollow tube as the rotatable portion of the helical gear within which the spindle is arranged.

15. The piston assembly of claim 9, wherein the exterior wheel does not rotate relative to a rotational position of the piston.

16. The piston assembly of claim 9, wherein each of the at least one planet wheel includes a respective pin connected to the helical gear, and the orbit of the at least one planet wheel rotates at least a portion of the helical gear via the respective pin of the each of the at least one planet wheel.

17. A hydraulic unit for a hydraulic vehicle brake system, the hydraulic unit comprising:
a hydraulic block; and
a piston pump assembly that includes:
an electric motor;
a planetary gear that is drivable by the electric motor;
a helical gear that is drivable into rotative motion by the planetary gear and converts a rotational motion into a displacement; and
a piston-cylinder unit including a piston that is displaceable in a cylinder by the helical gear;
wherein:
a displaceable output element of the helical gear is connected in a rotatably and an axially fixed manner to the piston of the piston-cylinder unit, and the piston is retained in a rotatably fixed manner in the cylinder;
the cylinder of the piston-cylinder unit of the piston pump assembly is accommodated in an accommodation in the hydraulic block;
the electric motor of the piston pump assembly is secured to the hydraulic block; and
at least one of the following two features (1)-(2):
(1) the helical gear includes a hollow tube with the displaceable output element of the helical gear being at least partly arranged in the hollow tube, the electric motor includes a rotor, and the piston pump assembly further includes a shaft on a back region of which the rotor is radially and fixedly arranged so that rotation of the rotor rotates the shaft, the shaft extending forward from the back region of the shaft to connect to a forward end of the shaft on which a sun wheel of the planetary gear is fixed beyond a front end of the rotor, with (a) the helical gear being arranged forward of the planetary gear, and (b) the sun wheel directly rotating at least one planet wheel whose axial position is at least partially shared with the sun wheel, thereby causing the at least one planet wheel to directly rotate the hollow tube; and (2) the planetary gear includes an exterior wheel, the sun wheel, and the at least one planet wheel, the sun wheel and the at least one planet wheel are, with respect to a radial direction, interior to a radial region occupied by the exterior wheel, the at least one planet wheel is in toothed connection with exterior teeth of the sun wheel and in toothed connection with interior teeth of the exterior wheel, and at least one of the following two features (a)-(b):

(a) a rotatable portion of the helical gear forms a planet carrier that carries the at least one planet wheel and on which the at least one planet wheel is rotatably mounted; and (b) the electric motor is arranged to directly drive the sun wheel to rotate, the sun wheel is arranged to directly drive each of the at least one planet wheel to rotate when the sun wheel is driven to rotate by the electric motor, each of the at least one planet wheel is arranged to orbit a center axis of the exterior wheel when driven to rotate by the sun wheel, and the orbit is the rotative motion of the helical gear.

18. The hydraulic unit of claim 17, wherein a motor housing of the electric motor retains the cylinder of the piston-cylinder unit in a rotatably and axially fixed manner on the hydraulic block.

19. The hydraulic unit of claim 18, wherein the cylinder has a fastener which is clamped by the motor housing of the electric motor with axial preloading against the hydraulic block.

20. The hydraulic unit of claim 17, wherein the helical gear includes the hollow tube with the displaceable output element of the helical gear being at least partly arranged in the hollow tube, the electric motor includes the rotor, and the piston pump assembly further includes the shaft on the back region of which the rotor is radially and fixedly arranged so that rotation of the rotor rotates the shaft, the shaft extending forward from the back region of the shaft to connect to the forward end of the shaft on which the sun wheel of the planetary gear is fixed beyond the front end of the rotor, with (a) the helical gear being arranged forward of the planetary gear, and (b) the sun wheel directly rotating the at least one planet wheel whose axial position is at least partially shared with the sun wheel, thereby causing the at least one planet wheel to directly rotate the hollow tube.

21. The hydraulic unit of claim 17, wherein the planetary gear includes the exterior wheel, the sun wheel, and the at least one planet wheel, the sun wheel and the at least one planet wheel are, with respect to the radial direction, interior to the radial region occupied by the exterior wheel, the at least one planet wheel is in toothed connection with exterior teeth of the sun wheel and in toothed connection with interior teeth of the exterior wheel, and the rotatable portion of the helical gear forms the planet carrier that carries the at least one planet wheel and on which the at least one planet wheel is rotatably mounted.

22. The hydraulic unit of claim 17, wherein the planetary gear includes the exterior wheel, the sun wheel, and the at least one planet wheel, the sun wheel and the at least one planet wheel are, with respect to the radial direction, interior to the radial region occupied by the exterior wheel, the at least one planet wheel is in toothed connection with exterior teeth of the sun wheel and in toothed connection with interior teeth of the exterior wheel, the electric motor is arranged to directly drive the sun wheel to rotate, the sun wheel is arranged to directly drive each of the at least one planet wheel to rotate when the sun wheel is driven to rotate by the electric motor, each of the at least one planet wheel is arranged to orbit the center axis of the exterior wheel when driven to rotate by the sun wheel, and the orbit is the rotative motion of the helical gear.

* * * * *